United States Patent [19]

Chao et al.

[11] Patent Number: 5,748,602
[45] Date of Patent: May 5, 1998

[54] SINGLE-LENS OPTICAL PICK-UP HEAD FOR ACCESSING A DVD DISC AND A CD DISC BY SWITCHING BETWEEN TWO OPTICAL STATES

[75] Inventors: Zu-Wen Chao, Shinchu; Tsung-Ming Yang, Chilung; Shin-Ter Tsai, Taipei; Jau-Jiu Ju, Shinchu Hsien; Pei-Yih Liu, Chichou Hsiang, all of Taiwan

[73] Assignee: Industrial Technology Research Institute, Taiwan

[21] Appl. No.: 763,437
[22] Filed: Dec. 11, 1996

[30] Foreign Application Priority Data

Sep. 24, 1996 [TW] Taiwan ................................ 8511689

[51] Int. Cl.⁶ ............................................. G11B 7/00
[52] U.S. Cl. ......................................... 369/112; 369/110
[58] Field of Search ................................. 369/112, 110, 369/109, 44.23, 44.24, 32

[56] References Cited

U.S. PATENT DOCUMENTS 5,428,588  6/1995  Ohuchida .................................. 369/110
5,600,614  2/1997  Katayama ................................. 369/112

Primary Examiner—Nabil Hindi
Attorney, Agent, or Firm—Rabin, Champagne & Lynt, P.C.

[57] ABSTRACT

A single-lens optical pick-up head has a laser diode, a beam splitter, a collimator, a polarizing light converter, a polarization controller, a polarizing beam splitter, a first quarter-wavelength plate, a mirror, a second quarter-wavelength plate, a convex mirror, an objective lens and a photodetector, for use in accessing DVD and CD discs by switching its optical property between two states.

17 Claims, 5 Drawing Sheets

SINGLE-LENS OPTICAL PICK-UP HEAD FOR ACCESSING A DVD DISC AND A CD DISC BY SWITCHING BETWEEN TWO OPTICAL STATES

BACKGROUND OF THE INVENTION

1. Field of the Invention

The invention relates in general to a pick-up head for Digital Versatile Disc (DVD) and Compact Disc (CD) systems, and more particularly to a pick-up head with one objective lens which can be switched between two optical states.

2. Description of the Related Art

It is a common commercial promise that a DVD player can not only work with DVD discs, but also compatibly work with traditional CD discs. When picking up data from a DVD disc, the pick-up head works with a shorter focal length, and when picking up data from a CD disc, the pick-up head works with a longer focal length. So a single-lens DVD player pick-up head has to provide two focal points of different focal length. There are two ways to do this. One is based on a simultaneity concept, i.e., to provide such two focal points at the same time; the other is based on an alternation concept, i.e., to make the two focal points appear at different time. The former way is the conventional way and will be described only briefly. The later one is the category that the present patent belongs to.

FIG. 1 shows the structure of a conventional single-lens DVD pick-up head, whose structure and operation may be described as follows:

When a laser beam generated by a laser diode 11 passes through a beam splitter 12, its energy drops from E0 to E1 (E1=0.5 E0). The beam with energy E1 reaches an holographic optical element (HOE) 15, after transmitting through a collimator 13 and being reflected by a folding mirror 14.

Once the beam reaches the HOE 15, the beam is diffracted and split thereby into two beams with different states including: a beam H0 with an energy E2, and another beam H1 with an energy E3. By designing and manufacturing the HOE 15 properly, it is possible to set the energy E2 and the energy E3 each approximately equal to 0.5 E1 or 0.25 E0 (E2=0.5E1=0.25 E0,E3=0.5E1=0.25 E0).

The two beams H0 and H1 pass together through an objective lens 16. Beam H0 focuses on a point A which will be hitting the surface of the DVD disc 17, with a relatively shorter focal length of about 3.4 mm, and beam H1 focuses on point B which will be hitting the surface of the CD disc 19, with a relatively longer focal length of about 3.5 mm.

The beam H0 reaches the surfaces of the DVD disc 17 and is reflected to form a beam H0J0. The beam H0J0 will have an energy E4 (E4=E2=0.25 E0) assuming that the surface of the disk has a reflectivity of 100%. The reflected beam H0J0 goes through the objective lens 16 and the HOE 15. Then, because of diffraction, the beam H0J0 splits into two beams H0J0K0 and H0J0K1, with energies E5 and E6 (E5=E6=0.5 E4=0.125 E0) respectively. Finally, the two beams H0J0K0 and H0J0K1 reach a photodetector 18 by way of the mirror 14, the collimator 13 and the beam splitter 12.

The beam H1 is similarly processed: The beam H1, with an energy of E3 is reflected from the surface of the CD disc 19 to form a reflected beam H1J1 having an energy E7 (E7=E3=0.25 E0) assuming that the surface of the disk has a reflectivity of 100%. It passes through the HOE 15, and is divided by diffraction into two beams H1J1K0 and H1J1JK1 with energies E8 and E9 (E8=E9=0.5 E4=0.125 E0), respectively. The two beams H1J1K0 and H1J1K1 reach the photodetector 18 through the mirror 14, the collimator 13 and the beam splitter 12.

Therefore, in the above described system, four beams H0J0K0, H0J0K1, H1J1K0 and H1J1K1 reach the photodetector 18 simultaneously. These four beams, however, have different cross sectional shapes, and the photodetector 18 can only detect the one which has the best beam shape and generates a significant signal.

The servo unit of the system will automatically let point A hit the surface of the DVD disc 17 when the DVD disc 17 is inserted. In this case the beam H0J0K0 is the one with a good shape. The beam that hits the photodetector 18 and generates a significant signal is the one that comes from the beam H0J0K0 and is reflected from the beam splitter 12 with an energy E10 (E10=0.5 E5=0.0625 E0).

Similarly, when a CD disc 19 is inserted, the servo unit of the system will automatically let point B hit the surface of the CD disc 19. Now the beam H1J1K1 is the one with a good shape. After being reflected by the beam splitter 12 and reaching photodetector 18, the beam has an energy E11 (E11=0.5 E9=0.0625 E0).

From the discussion above it can be seen that the conventional system, under any circumstances, can receive at most 6.25% of the total energy compared with the energy generated by the laser diode.

The above described conventional system therefore has at least two major defects:

Waste of Energy

The conventional system can only generate a small signal because the beams go through a low efficiency holographic optical element and are diffracted too many times. All but one of the beams can be significantly detected after these processes, which means that most of the energy cannot be received. According to the above description the energy of beam E10, for example, equals 0.0625 E0 which means that roughly 93.75% of the total energy is lost and wasted.

Servo Noise

The conventional system can operate on only one beam at a time. So at any given time, the system is not working on another beam. The beam which the system is not working will be diffused near the surface of the DVD or CD disc. The diffused beam becomes the noise which may disturb the system. Moreover, it can cause confusion and incorrect operations. For example, the system might make a mistake to let the point B hit a DVD disc.

SUMMARY OF THE INVENTION

It is therefore an object of the invention to provide a new DVD pick-up head which can operate on both DVD and CD discs without passing beams through a low efficiency holographic optical element, and therefore no beams with different states are generated by diffraction. With such a new pick-up head, problems of the conventional pick-up head, such as the limitation to detect only one beam among all and the energy waste, are avoided.

It is another object of the invention to provide a DVD pick-up head which can operate with both DVD and CD discs by switching an optical characteristic (e.g., polarization) and has only one focal point at any given time.

The invention achieves the above-identified objects by providing a new DVD pickup head which includes a laser diode used as a beam source to generate a first laser beam. A beam splitter is provided to divide the first beam into two beams and direct a second beam with a smaller energy in the same direction as the first beam. A collimator provides a parallel beam from the second beam. A polarizing light converter receives the parallel beam and provides a third beam. A polarization controller switches the polarizing light converter. A polarizing beam splitter receives the third beam and provides a fourth beam which is perpendicular to the third beam. An objective lens focuses the fourth beam on the surface of a disc and provides a fifth beam, in a direction opposite to that of the fourth beam, after the fourth beam is reflected from the surface of the disc. A photodetector is provided to produce a photoelectric signal by detecting a sixth beam which is provided when the fifth beam is reflected by the beam splitter after passing along a return path through the polarizing beam splitter, the polarizing light converter and the collimator lens.

BRIEF DESCRIPTION ON THE DRAWING

Other objects, features, and advantages of the invention will become apparent from the following detailed description of preferred embodiments, with reference to the accompanying drawings in which:

FIG. 1 schematically shows the structure of a conventional single objective lens DVD pick-up head;

FIG. 2 perspectively shows the structure of a single-lens optical pick-up head for accessing a DVD disc and a CD disc by switching between two optical states;

FIG. 3 schematically shows a structure similar to FIG. 2;

FIG. 4 schematically shows the polarizing light converter 24 of FIG. 2 in accordance with the first embodiment; and FIG. 5 schematically shows the polarizing light converter 24 of FIG. 2 in accordance with the second embodiment.

DETAILED DESCRIPTION OF THE PREFERRED EMBODIMENTS

Figure 1:
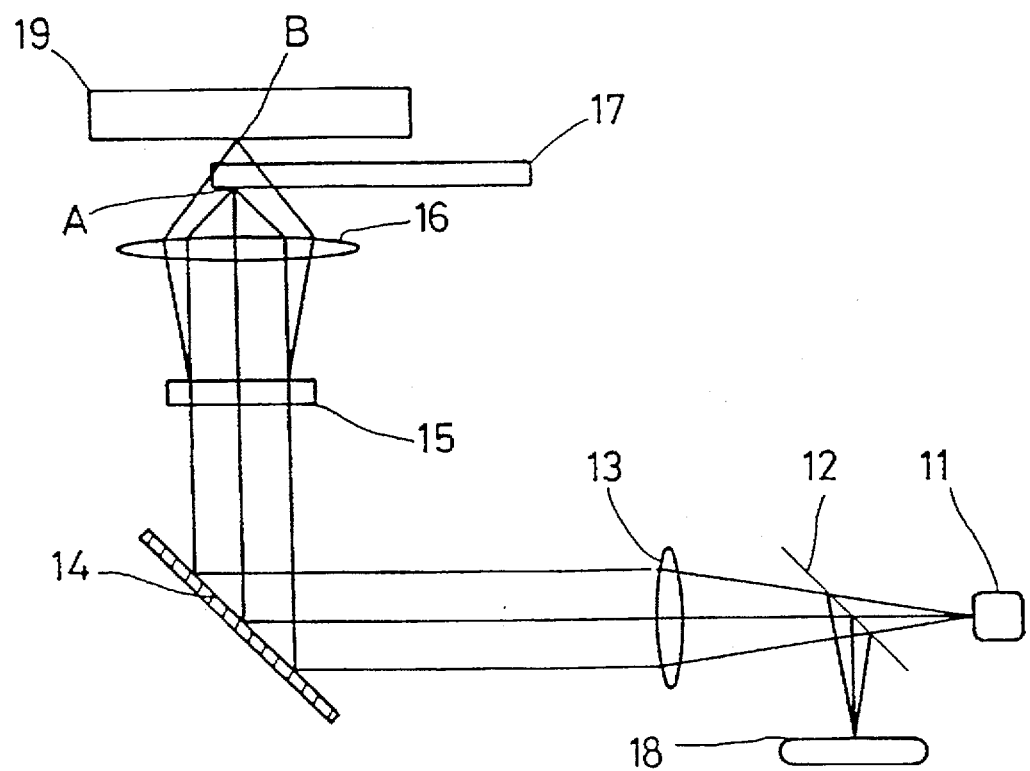
Figure 2:
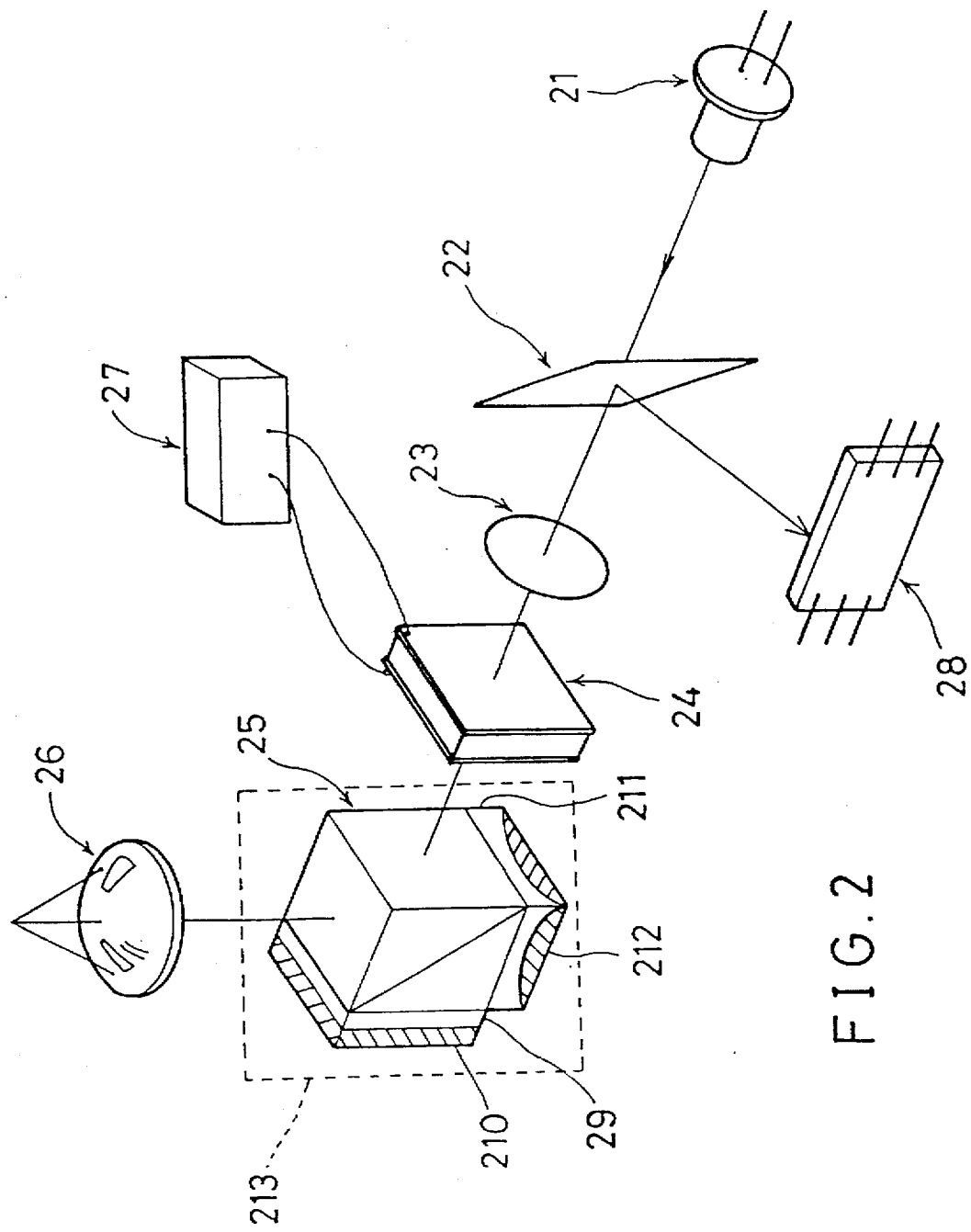

FIG. 2 schematically shows the structure of a single-lens optical pick-up head for accessing a DVD disc and a CD disc by switching an optical property between two states. As shown in FIG. 2, the pick-up head includes a laser diode 21, a beam splitter 22, a collimator 23, a polarizing light converter 24, a polarizing beam splitter 25, an objective lens 26, a polarization controller 27, a photodetector 28, a first quarter-wavelength plate 29, a mirror 210, a second quarter-wavelength plate 211, and a convex mirror 212. The first quarter-wavelength plate 29, which has two planar side surfaces, is fixed on one side to a vertical surface of the polarizing beam splitter 25, and the mirror 210, which also has two planar surfaces, is fixed to the other side of the quarter-wavelength plate 211. The second quarter-wavelength plate 211 has one planar surface and one concave surface. The planar surface is stuck to the bottom surface of the polarizing beam spiltter 25, and the concave surface is connected with the convex surface of the convex mirror 212, which also has one convex surface and one planar surface.

The polarization optical device 213 shown in FIG. 2 will reflect a beam completely if the beam is an S-type polarizing light beam, and will permit complete pass through if the beam is a P-type polarized light beam. The device 213 includes the polarizing beam splitter 25, the first quarter-wavelength plate 29, the mirror 210, the second quarter-wavelength plate 211, and the convex mirror 212.

Figure 3:
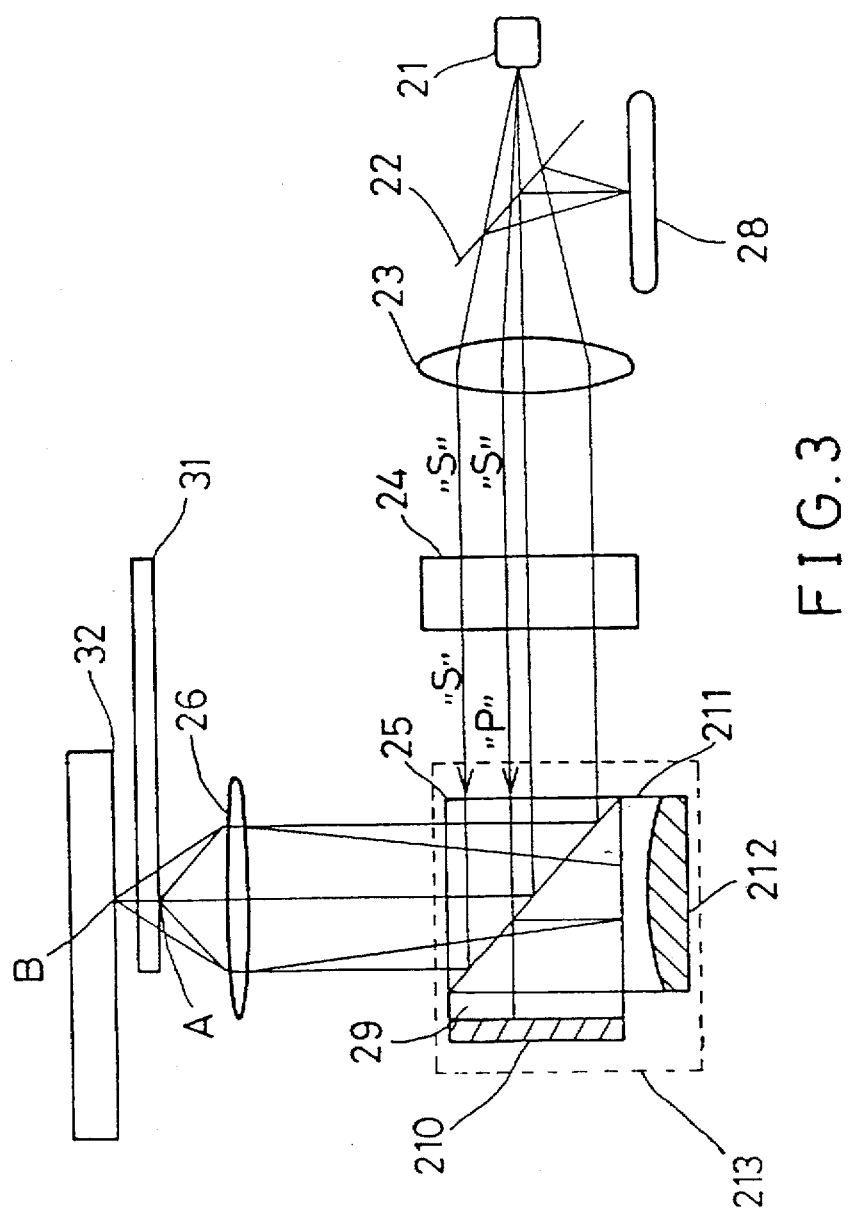

Reference is also made to FIG. 3 for the following description. When the system of FIG. 2 works on a DVD disc 31, as shown in FIG. 3, the laser diode 21 provides a beam with S-type polarization which has an energy E0. The beam energy will drop from E0 to E1 after passing through the beam splitter 22 (E1=0.5 E0). If the polarization controller 27 does not let the converter 24 to change the beam polarization, the beam will reach the polarizing beam splitter 25 still having an S-type polarization after passing through the polarizing light converter 24. After that, the beam is reflected by the polarizing beam splitter 25 and passes vertically upward through the objective lens 26 to focus at point A, which hits the surface of the DVD disc 31, with a comparatively shorter focal length, and an energy E2 (E2= E1=0.5 E0). Assuming that the reflectivity of the disc 31 is 100%, after the beam is reflected from the disc 31, it passes through the objective lens 26, the polarizing beam splitter 25, the polarizing light converter 24, and the collimator 23. The reflected beam reaches the beam splitter 22 with an energy E3 (E3=E2=0.5 E0). Then the beam splitter 22 reflects 50% of this reflected beam to form a new beam which has energy E4 (E4=0.5 E3=0.25 E0) and which is directed downward to the photodetector 28 where it is detected to generate an electric signal, representing data on the DVD disc 31.

Now consider a case in which the system operates on a CD disc 32. When a beam with an energy E0 and S-type polarization passes through the beam splitter 22, its energy will drop from E0 to E1 (E1=0.5 E0). After passing through the collimator 23, the parallel rays of the beam pass toward the polarizing light converter 24. Now, the polarization controller 27 orders the converter 24 to a "working" state to convert the polarization of the beam with energy E1 from S-type to P-type as the beam passes through the polarizing light converter 24. The now P-type polarization light beam passes through the polarizing beam splitter 25 to the first quarter-wavelength plate 29, which transforms the beam into a circularly polarizing light beam. The circularly polarizing beam is then transformed into an S-type polarization light beam after being reflected from the mirror 210 and passing again through the first quarter-wavelength plate 29. The now S-type polarizing beam is reflected by the polarizing beam splitter 25 downward through the second quarter-wavelength plate 211 to the convex mirror 212. The beam is reflected from the convex mirror 212 and passes again through the second quarter-wavelength plate 211, thereby reverting to a P-type polarization. It then passes upward through the polarizing beam splitter 25 and the objective lens 26 to focus at point B, a comparatively more distant focal point hitting the surface of the CD disc 32, with an energy E5 (E5=E1=0.5 E0). Assuming that the reflectivity of the CD disc 32 is 100%, the beam is reflected from point B with an energy E6 (E6=E5=0.5 E0). The reflected beam passes through the objective lens 26, the polarization beam splitter 25, and the second quarter-wavelength plate 211, and is then reflected from the convex mirror 212. The beam then passes through the second quarter-wavelength plate 211 again, is directed by the polarizing beam splitter 25 to the first quarter wave-length plate 29, is reflected from the mirror 210, and passes through the first quarter wave-length plate 29 again, is passed by the polarizing beam splitter 25, through the polarizing light converter 24, and the collimator 23 to the beam splitter 22. Here part of the beam is reflected downward to the photodetector 28 with an energy E7 (E7=0.5 E6=0.25 E0), which generates an electric signal, representing data from the CD disc 32.

The polarizing light converter 24 may be either of two types, i.e., a mechanical type 24A or an electric type 24B, which are now described below.

Figure 4:
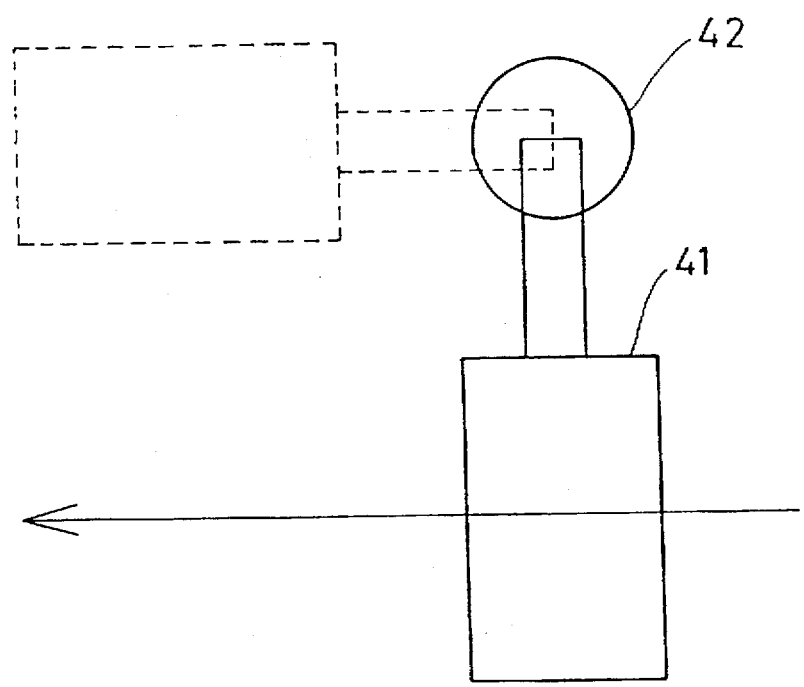

FIG. 4 shows a mechanical type polarizing light converter 24A. The polarizing light converter 24A consists of a half-wavelength plate 41 which, with mechanical apparatus 42, can be switched into and out of the light path by being moved up and down. Referring to both FIG. 2 and FIG. 4, when working on the DVD disc 31, the polarization controller 27 directs the mechanical apparatus 42 to move the half-wavelength plate 41 out of the path of the light beam, and the light beam maintains an S-type polarization, which is the same as the beam generated from the laser diode 21, after passing through the polarizing light converter 24A. When working on the CD disc 32, the polarization controller 27 directs the mechanical apparatus 42 to move the half-wavelength plate 41 into the path of the light beam, and the light beam is thereby transformed to have P-type polarization, which is different from the beam generated from the laser diode 21, after passing through the polarizing light converter 24.

Figure 5:
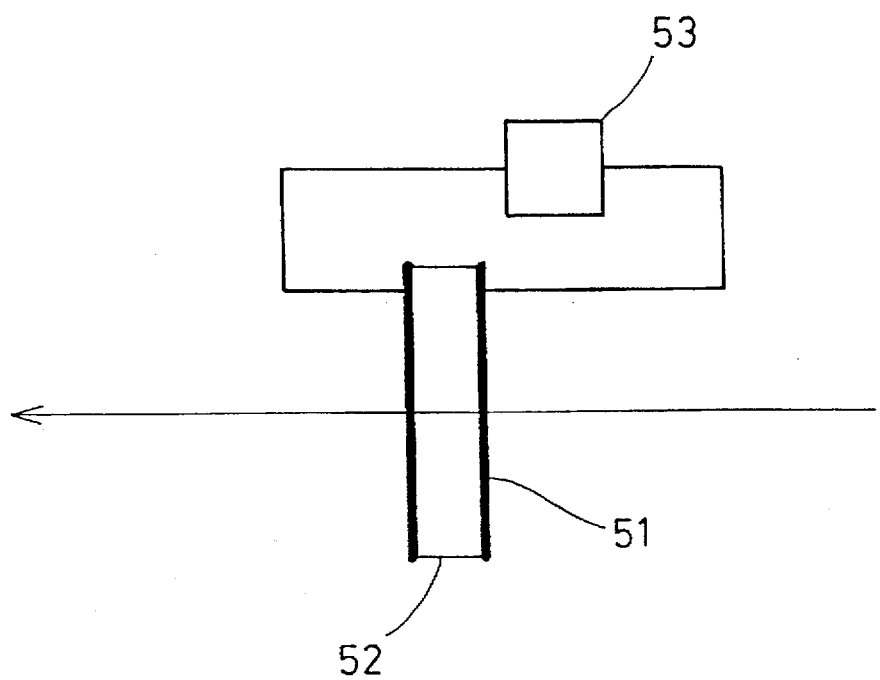

FIG. 5 shows an electric type polarizing light converter 24B having a liquid-crystal 52 with a transparent electrode 51 and a voltage-control circuit 53. The liquid-crystal 52 is fixed (immovably disposed) in the path of the light beam. When the system operates on the DVD disc 31, the voltage-control circuit 53, under the control of the polarization controller 27, provides a voltage to the liquid-crystal 52, and the passing light beam retains an S-type polarization, which is the same as the beam generated from the laser diode 21, after passing through the polarizing light converter 24B. When the system is operating on the CD disc 32, the voltage-control circuit 53, under the control of the polarization controller 27, now does not provide any voltage to the liquid-crystal 52 and so the polarization of the light beam is transformed to P-type, which is different from the beam generated from the laser diode 21, after passing through the polarizing light converter 24B.

Advantageous properties of the invention which can be observed include that the pick-up head of the invention generates a stronger electric signal without using a holographic optical element therefore it does not lose energy by diffraction process due to holographic optical elements. Thus, for example, the photodetectors of the pick-up head of the invention receive 25% of the total light energy produced by the laser, which is four times larger than the 6.25% received by the photodetectors in the above described conventional device.

The pick-up head of the invention operates by switching the polarization of the beam. Thus, as described above, when a DVD disc is inserted and the light beam holds an S-type polarization, the system will focus the beam on only one point with a comparatively shorter focal length. When a CD disc is inserted, the light beam holds a P-type polarization, and the system then focuses the beam on a point with a comparatively longer focal length. Thus, the pick-up head of the invention generates only one focal point at any given instant.

As a result, the pick-up head of the invention can reduce the shortcomings of the conventional device as to energy loss and servo noise.

The following table compares the invention with the conventional pick-up head previously described.

| Parameter | Conventional | The Invention |
|---|---|---|
| The existence of two focuses | at same time | not at same time |
| The received energy | 6.25% | 25% |
| The service unit for | easily to be confused | absolutely not |

-continued

| Parameter | Conventional | The Invention |
|---|---|---|
| focusing | | |
| The photoelectric signal | weaker | confused stronger |
| The number of polarizing light converters | 0 | 1 |
| The number of convex mirrors | 0 | 1 |
| The number of low efficiency holographic optical elements | 1 | 0 |
| The number of reversing mirrors | 1 | 0 |
| The number of polarizing beam splitters | 0 | 1 |
| The number of quarter-wavelength plates | 0 | 2 |
| The number of laser diode | 1 | 1 |
| The number of objective lenses | 1 | 1 |
| The number of photodetectors | 1 | 1 |

From the above table, two advantageous properties of this invention are apparent:

1. A light beam with more energy can be detected so that a stronger electric signal can be generated by the photodetector.

2. The servo unit for focusing is not confused and does not make mistakes.

While the invention has been described by way of examples and in terms of preferred embodiments, the invention is not limited thereto. To the contrary, it is intended to cover various modifications, procedures and products, and the scope of the appended claims therefore should be accorded to the broadest interpretation so as to encompass all such modifications and similar arrangements, procedures and products.

What is claimed is:

1. A single-lens optical pick-up head for use in accessing both DVD and CD discs, comprising:

a laser diode for providing a first light beam having a polarization;

a beam splitter for receiving the first light beam in a first direction from said laser diode, and passing therethrough, in the first direction, a portion of the first light beam as a smaller second light beam;

a collimator disposed to receive and collimate the second light beam;

a polarizing light converter disposed to receive the second collimated light beam and output a third light beam;

a polarization controller for modulating said polarizing light converter so that the polarizing light converter selectively passes the second collimated light beam output as the third light beam, with or without converting the polarization thereof, a polarization optical device disposed to receive the third light beam from said polarizing light converter and provide a fourth light beam in a second direction different from the first direction;

an objective lens, disposed to focus the fourth light beam on one of the discs which reflects the fourth beam from a surface of the disc back through said objective lens so as to provide a reflected light beam as a fifth light beam passing in a third direction opposite to the second direction, back through said polarization optical device which directs the fifth beam in a direction opposite to the first direction through said polarizing light converter, and said collimator to said beam splitter; and a photodetector, for receiving a sixth light beam from said beam splitter as a reflected part of the fifth light beam, said photodetector providing an electric output signal based thereon.

2. The single-lens optical pick-up head of claim 1, wherein said polarization optical device includes:

a polarization beam splitter;

a first quarter-wavelength plate having two parallel planar surfaces, a first one of the planar surfaces being fixed to a first surface of said polarization beam splitter perpendicular to the third light beam;

a mirror fixed to a second of the two planar surfaces of said first quarter-wavelength plate;

a second quarter-wavelength plate having one planar surface and one concave surface opposite the planar surface, the planar surface being fixed to a second surface of said polarization beam splitter facing said polarization beam splitter in a direction toward said objective lens; and a convex mirror fixed to the concave surface of said second quarter-wavelength plate.

3. A single-lens optical pick-up head according to claim 2, wherein the polarizing light converter is responsive to the polarization controller to (1) convert the polarization of the second collimated light beam in order to access a CD disc and (2) to not convert the polarization of the second collimated light beam in order to access a DVD disc, or vice versa.

4. The single-lens optical pick-up head of claim 3, wherein the second collimated light beam has half of the energy of the first light beam.

5. The single-lens optical pick-up head of claim 4, wherein said polarizing light converter does not convert the polarization of the second collimated beam when the disc is a DVD disc.

6. The single-lens optical pick-up head of claim 5, wherein the third light beam passes into said polarizing beam splitter in the first direction and is directed from the polarizing beam splitter in the second direction as the fourth light beam wherein the second direction is perpendicular to the first direction.

7. The single-lens optical pick-up head of claim 6, wherein the energy of the fifth light beam is equal to the energy of the fourth light beam.

8. The single-lens optical pick-up head of claim 7, wherein the energy of the sixth light beam is equal to 50% of the energy of the fifth light beam.

9. The single-lens optical pick-up head of claim 2, wherein the disc from which the fourth beam is reflected is a CD disc.

10. The single-lens optical pick-up head of claim 9, wherein the second collimated light beam has a half the amount of energy of the first light beam.

11. The single-lens optical pick-up head of claim 10, wherein the second collimated light beam has an S-type polarization.

12. The single-lens optical pick-up head of claim 11, wherein when the disk is a CD disc, said polarization controller controls said polarizing light converter to convert the polarization of the second collimated light beam.

13. The single-lens optical pick-up head of claim 12, wherein said third light beam passes through said polarizing beam splitter and said first quarter-wavelength plate, is reflected from said mirror, passes back through said first quarter-wavelength plate and thereby is then reflected from said polarizing beam splitter to and through said second quarter-wavelength plate, is reflected from said convex mirror, passes back through said second quarter-wavelength plate and thereby passes through said polarizing beam splitter and becomes the fourth beam.

14. The single-lens optical pick-up head of claim 13, wherein the energy of said fifth light beam is equal to the energy of said fourth light beam.

15. The single-lens optical pick-up head of claim 14, wherein the energy of said sixth light beam is equal to 50% of the energy of said fifth light beam.

16. The single-lens optical pick-up head of claim 1, wherein said polarizing light converter comprises a mechanical polarizing light converter.

17. The single-lens optical pick-up head of claim 1, wherein said polarizing light converter comprise an electric polarizing light converter.

* * * * *